US006645556B2

(12) United States Patent
Gueusquin

(10) Patent No.: US 6,645,556 B2
(45) Date of Patent: Nov. 11, 2003

(54) PROCESS FOR MARKING THE SURFACE OF AN ITEM MADE FROM A SILICA-BASED MATERIAL AND MARKING PRODUCT

(75) Inventor: Eric Gueusquin, Vatimont (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/095,508

(22) Filed: Mar. 12, 2002

(65) Prior Publication Data

US 2002/0150685 A1 Oct. 17, 2002

(30) Foreign Application Priority Data

Mar. 13, 2001 (FR) .............................. 01 03412

(51) Int. Cl.⁷ .............................. B05D 1/12; B05D 1/28
(52) U.S. Cl. ...................... 427/287; 427/106; 427/429; 106/31.05
(58) Field of Search .................... 427/106, 256, 427/287, 429, 397.7, 264, 269–271; 106/31.05; 445/22, 58; 65/39, 54, 60.8, 108, 120

(56) References Cited

U.S. PATENT DOCUMENTS

| | | | | |
|---|---|---|---|---|
| 1,862,366 A | * | 6/1932 | Boyer | |
| 2,723,205 A | * | 11/1955 | Gallup et al. | |
| 4,147,823 A | * | 4/1979 | Lavallee | |
| 4,421,803 A | | 12/1983 | Czeiler et al. | ................ 428/35 |
| 5,684,515 A | * | 11/1997 | Ho | |
| 6,165,655 A | | 12/2000 | Kawase et al. | ................ 430/18 |

FOREIGN PATENT DOCUMENTS

JP   03-005337   *  1/1991

OTHER PUBLICATIONS

Database WPI, section Ch, Week 198134, Derwent Publications Ltd., London, GB; AN 1981–61512D, XP002184139 & JP56084382A (GOTOA), Jul. 9, 1981.

Database WPI, Secion Ch, Week 198110, Derwent Publications Ltd., London, GB; AN 1981–17106D, XP002184138 & SU 746 781A (Rozhkina Z P), Jul. 17, 1980.

* cited by examiner

Primary Examiner—Fred J. Parker
(74) Attorney, Agent, or Firm—Ernestine C. Barlett

(57) ABSTRACT

A process for marking a glass body (14), by depositing directly onto the outer surface of the glass body (14), in a form representing the motif of the mark, a marking product (10) made from a substantially homogenous mixture of an ink and a silica powder, and heating the glass body (14) at a temperature sufficient to result in vitrification of the marking product (10).

9 Claims, 1 Drawing Sheet

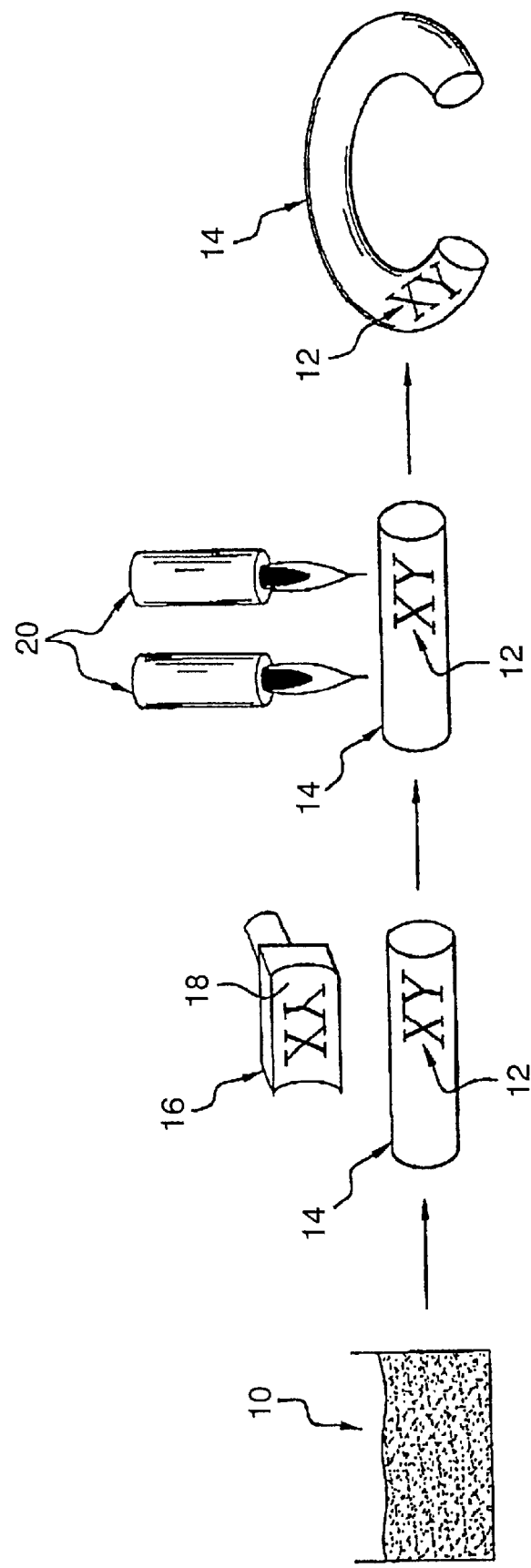

PROCESS FOR MARKING THE SURFACE OF AN ITEM MADE FROM A SILICA-BASED MATERIAL AND MARKING PRODUCT

TECHNICAL BACKGROUND/FIELD OF THE INVENTION

The present invention relates to a process for marking the surface of an item made from a silica-based material, such as the glass body of a light bulb.

During the manufacture of a light bulb that comprises a glass body, for example in the form of a tube, an identifying mark is generally placed on an element of the bulb.

This mark comprises, for example in the form of typographical characters, details of the technical characteristics of the bulb, of the name of the manufacturer, etc, which allow easy identification of each model of bulb, in particular during packaging, during installation and during replacement.

The mark represents a style of writing that must in particular be legible and easy to identify on the tube.

The glass tubes of some light bulbs, such as halogen type bulbs, reach very high operating temperatures, for example of the order of 800° C.

The inks for marking the glass are not resistant to these high temperatures. They are generally intended to withstand a maximum constant temperature of 500° C.

As a result, as it is not possible to apply a mark directly to the glass body of the bulb, a support is provided, generally of a ceramic material, that is an integral part of the glass tube and on which the marking ink is deposited.

As the temperature of the ceramic support remains well below the temperature of the glass tube, when the light bulbs operates normally, the heat produced by the tube does not degrade the ink which is then subject to a temperature close to that of the ceramic, for example 300° C.

However, the use of a ceramic support increases the manufacturing cost of the light bulb.

Moreover, mounting the support on the glass tube and marking it require special steps during the tube manufacturing process, which makes the manufacturing process complex and increases the manufacturing time.

Another disadvantage of the support is its size.

SUMMARY OF THE INVENTION

The invention aims to overcome these disadvantages by proposing a marking process that allows the application of a marking product directly to an outer surface of the glass body of the light bulb, without the need to provide a support.

To this end, the invention proposes a process for marking a surface of an item made from a silica-based material, characterized in that it includes the following steps:
creation of a mark on said surface by depositing a marking product made from a substantially homogenous mixture of an ink and a silica powder;
vitrification of the marking product on said surface by heating to a very high temperature.

According to other characteristics of the invention:
the marking product is deposited on the surface of the item prior to the final forming of said item, which final forming operation comprises a phase in which it is heated to a very high temperature, which causes the vitrification of the marking product onto the surface of the item;
the item is broadly in the form of a rectilinear tube before its final forming, with the final forming of the item comprising a so-called bending phase during which the item is heated to a very high temperature with a view to being bent, and said vitrification of the marking product is obtained during the bending phase;
the marking product is deposited on the surface of the item by means of an inking pad that is intended to take the marking product from an engraved imprint representing the motif of the mark;
the marking product comprises a diluent;
the marking product comprises a hardener;
the marking product is prepared by mixing in a homogenous fashion, according to proportions by weight, approximately 81% ink, 3% silica powder, 12% diluent and 4% hardener.

The invention also proposes a marking product for the implementation of the process in accordance with the invention, characterized in that it comprises a substantially homogenous mixture of ink and silica powder.

Other characteristics and advantages of the invention will become clear from a reading of the detailed description that follows, for an understanding of which reference is made to the annexed drawings in which the sole FIGURE is a diagram that illustrates a marking process in accordance with the particulars of the invention.

BRIEF DESCRIPTION OF THE DRAWING

The sole FIGURE shows the preferred method of carrying out the marking process in accordance with the invention.

DESCRIPTION OF THE PREFERRED EMBODIMENTS

In order to implement this process, a special marking product 10 is prepared by mixing, in a substantially homogenous manner, a marking ink, a silica powder, a diluent and a hardener.

Advantageously a black ink will be used which is intended for marking on glass, for example the model referenced "GL 073" from the "Marabuwerke GmbH & Co" company.

The ink comprises in particular a solid matter, or pigment, here black in color, and organic matter.

For the silica powder, the product referenced "Aerosil 200" from the "Degussa" company will be chosen.

For the diluent, the product referenced "SGLV" from the "Marabuwerke GmbH & Co" company will be chosen.

For the hardener, for example, the product referenced "SGLH" from the "Marabuwerke GmbH & Co" company will be chosen.

Advantageously, the proportions by weight of each ingredient in the mixture constituting the marking product 10 are:
81% ink;
3% silica powder;
12% diluent;
4% hardener.

It is noted that the tolerance to be met in these proportions is approximately 10%, but it is possible to add more of the diluent in order to increase the fluidity of the marking product 10 in order to facilitate depositing.

Preferably the marking product 10 is then deposited in the form of a mark 12 representing alphanumeric typographical characters, on an external surface of the item intended to be marked, which, in this case, is for example the substantially rectilinear glass tube 14 of a light bulb before its final forming.

For halogen type light bulbs, the glass of the tube 14 is generally referred to as quartz as it is made from substantially pure and amorphous silica.

The means used to apply the mark 12 to the glass surface are similar to those normally used to make a mark on a glass body with the marking ink used here.

Advantageously, the marking product 10 will be deposited using a so-called "tampography" machine, for example the "Tampoprint" machine, model "TT 50/31", that comprises rubber pads 16, or rubber gums, and metal plates with engravings of between 22 μm and 24 μm in depth.

In accordance with a conventional use of this machine, the marking motif is therefore engraved in a metal plate, then the marking product 10 is spread over the engraved face of the plate and the surplus product 10 is scraped off.

The marking face 18 of a rubber pad 16 is then pressed against the engraved face so that the marking product 10 adheres to the marking face 18 drawing a negative of the motif of the mark 12.

Then the marking face 18 of the pad 16 is pressed against the surface to be marked, here the outer surface of the glass tube 14, so that the marking product 10 is deposited there according to a style of writing corresponding to the desired mark 12.

In relation to the metal plates normally used, it is possible to increase the width of the engraved characters in order to improve the appearance of the contours of the mark 12 on the glass.

It is noted that the manual transfer of the marking product 10 from the pad 16 to the glass surface is possible, but this does not allow the desired uniformity of positioning to be obtained.

It is found that the marking product 10 dries quickly following deposition on the glass tube 14, with the mark 12 then forming a deposit in relief on the outer surface of the glass tube 14.

The tube 14 is then directed towards a heat source that, in this case, consists of rounding torches 20 that are used for the final forming of the tube 14, during a so-called "rounding", or bending, phase during which the tube 14 is bent.

During the transport of the tube 14 towards the torches 20, the tube 14 can be in contact with other tubes 14 or with hard surfaces. As the marking product 10 forming the mark 12 has not yet undergone heat treatment, rubbing or impacts on the surface of the tube 14 bearing the mark 12 due to collisions with other surfaces could cause the mark 12 to be spoiled or removed. That is why, preferably, the marking product 10 comprises a hardener that gives the mark 12 properties that make it resistant to rubbing and impacts.

During the rounding phase of the tube 14, the glass tube 14 and its mark 12 undergo a treatment at very high temperature, here a temperature in excess of 1800° C., for approximately three to five seconds.

The treatment at very high temperature is carried out by the torches 20 that heat the tube 14 so as to give it, for example, a toric shape overall.

This treatment at very high temperature causes the simultaneous vitrification of the marking product 10 to the surface of the glass. In fact, during this treatment at very high temperature the particles of silica fuse, thereby trapping the ashes of the marking ink pigment.

The passing of the mark 12 at very high temperatures through a highly reactive medium such as the hydrogen/oxygen flame produced by a rounding torch 20 renders the elements making up the marking product 10 inalterable at the conventional operating temperature of a halogen type light bulb, that is around 800° C.

The treatment at very high temperature constitutes, for the mark 12, a curing phase that ends with its vitrification.

The organic materials contained in the marking ink are almost totally destroyed during the treatment at very high temperature. They are decomposed into carbon dioxide and water.

When the tube 14 cools down to ambient temperature, the silica and the degraded pigment remain and are vitrified to the outer surface of the glass tube 14. The marking product 10 is therefore closely bonded to the outer surface of the tube 14.

According to a different embodiment (not shown) of the invention, the mark 12 is placed on the glass body 14 of the bulb after its final forming.

The tube 14 therefore first undergoes the rounding phase and then the mark 12 is applied to the toric tube 14. The mark 12 and the tube 14 are then subjected to a very high temperature, for example 1800° C., in order to vitrify the marking product 10 to the surface of the tube 14.

It is noted that, in accordance with this variant of the process in accordance with the invention, the vitrification of the mark 12 constitutes a separate step, whereas in the embodiment described previously, the vitrification step takes place simultaneously with the rounding step of the glass tube 14.

The mark 12 created with the marking process in accordance with the invention forms a translucent trace, corresponding to the initial print motif.

It is found that, following vitrification, it is impossible to erase the mark 12 other than by removing a superficial layer of material.

It is noted that during preparation of the mixture forming the marking product 10, the order of incorporation of the components into the mixture has no clear effect on the final quality of the mark 12 following its vitrification.

Following the vitrification of the mark 12, manufacture of the light bulb can continue in the conventional manner by arranging inside the tube 14 the various elements necessary for the creation of a halogen type bulb, such as a tungsten filament, electrical connectors and gas compounds, before welding the axial ends of the glass tube 14.

The process in accordance with the invention allows to suppress the ceramic support that constituted a costly component of the light bulb to be dispensed with.

Previously the presence of ceramic support parts interfered with the positioning of the electrical connectors for connection of the bulb during welding of the axial ends of the glass tube 14. Dispensing with the support therefore improves the control of the position of the electrical connectors.

Undetectable on a bulb when functioning, the mark 12 is visible when the light is off, against a light background.

Thanks to the process in accordance with the invention, it is possible to easily automate the marking on the glass tube 14 of a light bulb.

The marking procedure in accordance with the invention offers the advantage of being incorporated into the production line.

The marking process in accordance with the invention can be incorporated in the conventional manufacturing process of the tubes 14 without affecting the process of rounding of the tubes 14, since it has been found that the vitrification of the marking product 10 has no effect on the quality of manufacture of the glass tube 14. In particular, service life tests of a bulb comprising a glass tube 14 marked by a process in accordance with the invention revealed no traces of recrystallization of the quartz forming the tube 14.

It has been found that, even after more than one thousand hours of functioning of the light bulb, both the legibility of the characters and the resistance to erasure of the mark 12 created using the process in accordance with the invention remain unaffected.

Although the invention has been described within the context of its application, i.e. the marking of a light bulb, it goes without saying that a process in accordance with the invention can be used in numerous other applications where a quartz surface of an item of any kind, such as a plate, a lens or even a receptacle, accessible to a marking pad and a curing system allowing the vitrification of a deposit made by tampography, is intended to receive an identification marking.

What is claimed is:

1. Process for marking the surface of an item made from a silica-based material, wherein the process consists essentially of the following steps:

depositing a marking product in a form representing the motif of the mark directly on said surface, the marking product made from a substantially homogenous mixture of an ink and a silica powder, the ink consisting essentially of a pigment and organic matter; and heating the item at a temperature sufficient to result in vitrification of the marking product on said surface.

2. Process in accordance with claim 1, wherein the marking product is deposited on the surface of the item prior to final forming of said item, and wherein the final forming operation comprises a phase of heating to a temperature sufficient to result in vitrification of the marking product on said surface.

3. Process in accordance with claim 2, wherein the final forming operation includes a bending phase in which the item is bent during the phase of heating which results in vitrification of the marking product.

4. Process in accordance with claim 1, wherein the marking product is deposited on the surface of the item by means of a marking pad having an engraved imprint representing the motif of the mark.

5. Process in accordance with claim 1, wherein the marking product comprises a diluent.

6. Process in accordance with claim 1, wherein the marking product comprises a hardener.

7. Process in accordance with claim 5, wherein the marking product consists essentially of by weight, approximately 81 percent ink, 3 percent silica powder, 12 percent diluent and 4 percent hardener.

8. Marking product for the implementation of the process in accordance with claim 1, wherein it comprises a substantially homogenous mixture of ink and silica powder.

9. Process for marking the surface of an item made from a silica-based material, wherein the process comprises the following steps:

depositing a marking product on said surface prior to final forming of the item, the marking product made from a substantially homogenous mixture of an ink and a silica powder, the ink comprising a pigment and organic matter; and final forming the item, said final forming comprising (a) heating the item at a temperature sufficient to enable bending of the item and to result in vitrification of the marking product on said surface; and (b) bending the item.

* * * * *